United States Patent [19]
Cox

[11] Patent Number: 5,624,225
[45] Date of Patent: *Apr. 29, 1997

[54] CARGO CONTAINER HANDLING SYSTEM

[76] Inventor: Henry Cox, 141 Glass Hill Dr., Conway, S.C. 29526

[ * ] Notice: The term of this patent shall not extend beyond the expiration date of Pat. No. 5,417,540.

[21] Appl. No.: 447,960

[22] Filed: May 23, 1995

Related U.S. Application Data

[63] Continuation-in-part of Ser. No. 144,036, Nov. 1, 1993, Pat. No. 5,147,540.

[51] Int. Cl.$^6$ .................................................. B60P 1/64
[52] U.S. Cl. ........................................ 414/495; 414/498
[58] Field of Search ............................... 414/495, 498, 414/537; 410/80, 81, 90, 91; 280/763.1, 764.1, 765.1, 766.1

[56] References Cited

U.S. PATENT DOCUMENTS

| | | | |
|---|---|---|---|
| 1,329,956 | 2/1920 | Calataynd et al. | 414/498 |
| 1,425,965 | 8/1922 | Hocke | 414/498 X |
| 2,478,578 | 5/1949 | Gottshall | 410/81 |
| 2,934,373 | 4/1960 | Doty, Jr. | 414/498 |
| 2,958,358 | 11/1960 | Norris et al. | 414/498 |
| 3,119,503 | 1/1964 | Herpich et al. | 414/498 X |
| 3,152,709 | 10/1964 | Fowler . | |
| 3,499,562 | 3/1970 | Phillips . | |
| 3,520,433 | 7/1970 | Blackburn | 414/498 |
| 3,619,007 | 11/1971 | Phillips . | |
| 3,722,948 | 3/1973 | Walsh et al. . | |
| 3,724,697 | 4/1973 | Arvidsson | 414/498 X |
| 3,730,366 | 5/1973 | Berends | 414/495 |
| 3,817,413 | 6/1974 | Ham . | |
| 3,825,137 | 7/1974 | Mackrill et al. . | |
| 3,995,760 | 12/1976 | Burgdorf et al. | 414/498 |
| 4,000,924 | 1/1977 | Blasingame | 280/766.1 X |
| 4,053,073 | 10/1977 | Franchin | 414/498 |
| 4,076,299 | 2/1978 | Dalton | 414/498 |
| 4,089,539 | 5/1978 | Berger . | |
| 4,227,843 | 10/1980 | Damm | 414/498 X |
| 4,339,148 | 7/1982 | Smith et al. . | |
| 4,382,733 | 5/1983 | Rodgers . | |
| 4,629,085 | 12/1986 | Weitefeld . | |
| 4,746,262 | 5/1988 | Anderson | 414/495 |
| 5,213,458 | 5/1993 | Preller et al. | 414/498 X |
| 5,281,072 | 1/1994 | Patourillard et al. | 414/498 X |
| 5,417,540 | 5/1995 | Cox | 414/498 X |

FOREIGN PATENT DOCUMENTS

| | | | |
|---|---|---|---|
| 1577274 | 6/1969 | France | 414/498 |
| 2031330 | 3/1972 | Germany | 414/498 |
| 169444 | 2/1982 | Netherlands | 414/495 |
| 700486 | 12/1953 | United Kingdom | 414/498 |

Primary Examiner—David A. Bucci
Attorney, Agent, or Firm—Dowell & Dowell

[57] ABSTRACT

A system for hauling cargo containers which includes elevatable frames on which containers are supported for loading, shipment, unloading and storage. The frames are designed to be mounted to alignment cradles carried by transport vehicles such as conventional trailers. Lifting devices are mounted on the frames and/or the alignment cradles to raise and lower the frames relative to the vehicles so that the containers may be loaded or unloaded without separate lifts or cranes. The frames include support legs which are movable outwardly and pivotable vertically so as to support the frames in elevated relationship to the transport vehicles.

20 Claims, 5 Drawing Sheets

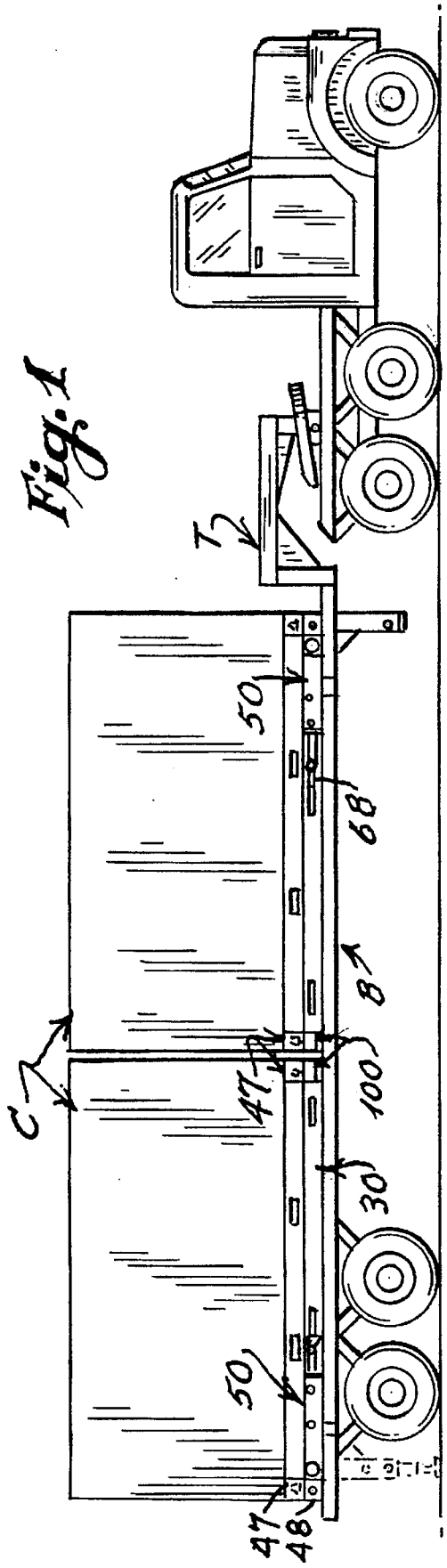
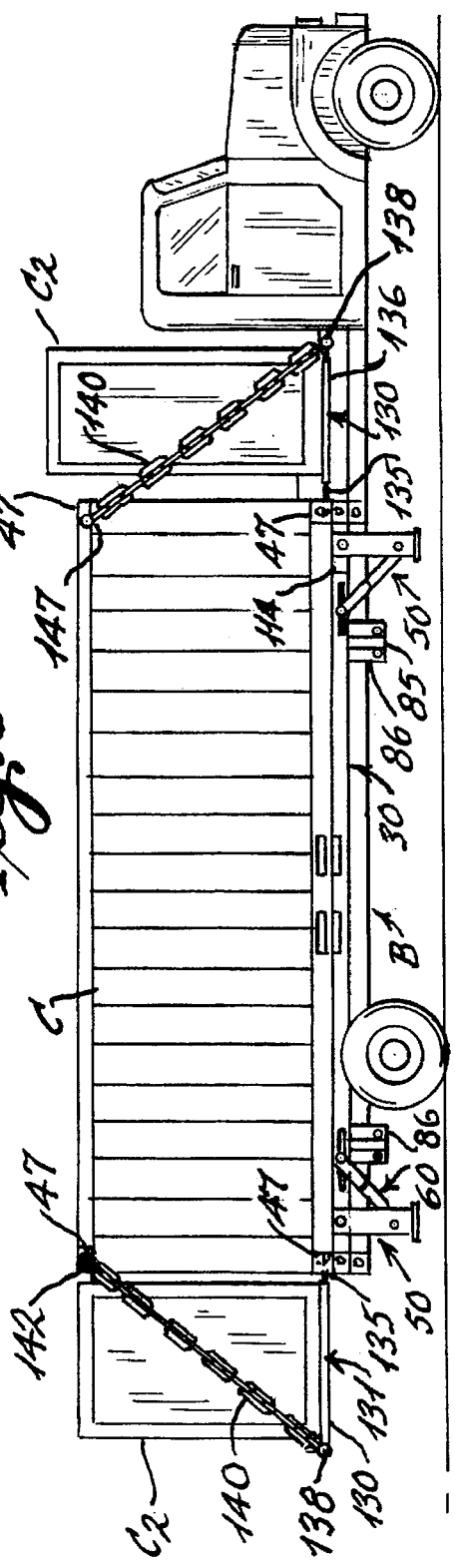

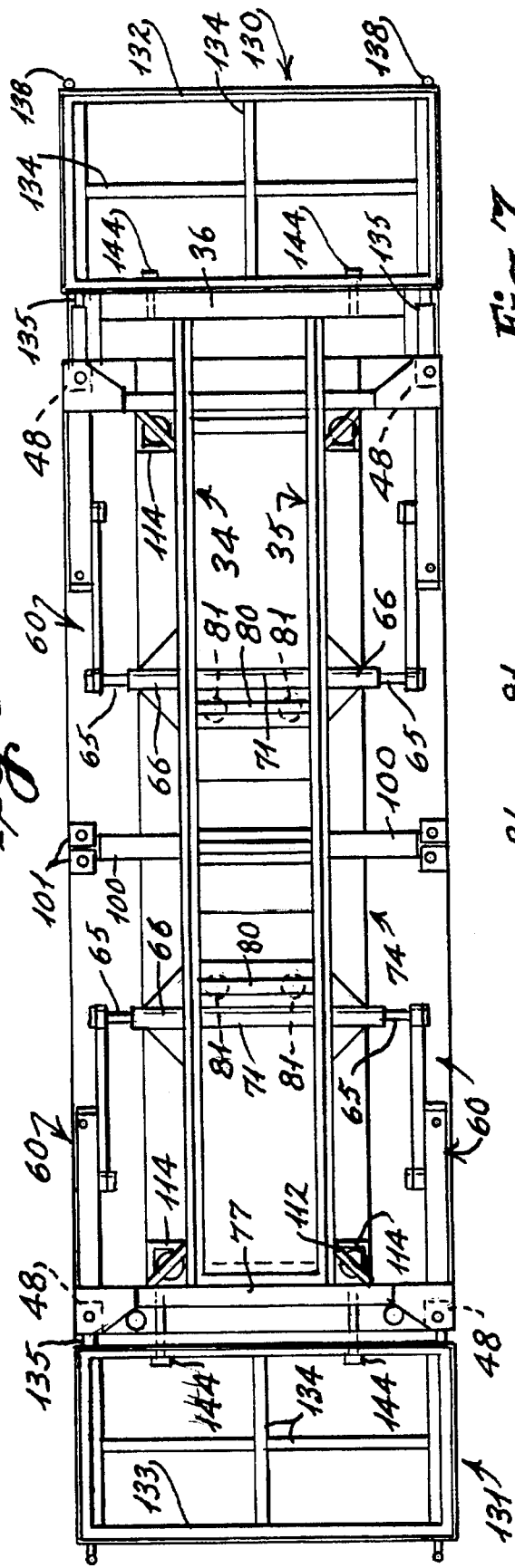
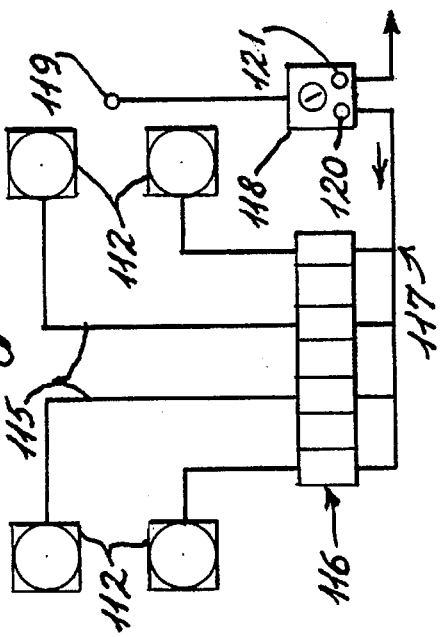
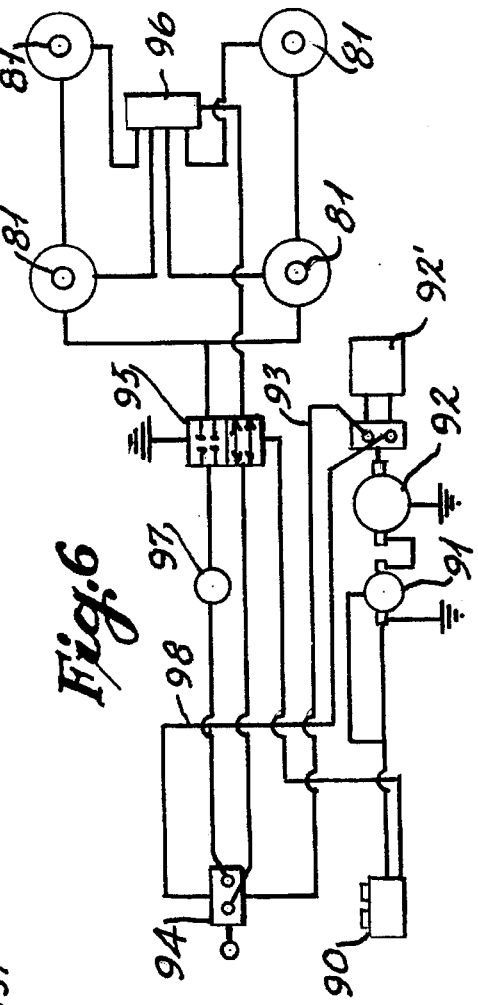
Fig. 9
Fig. 7
Fig. 6

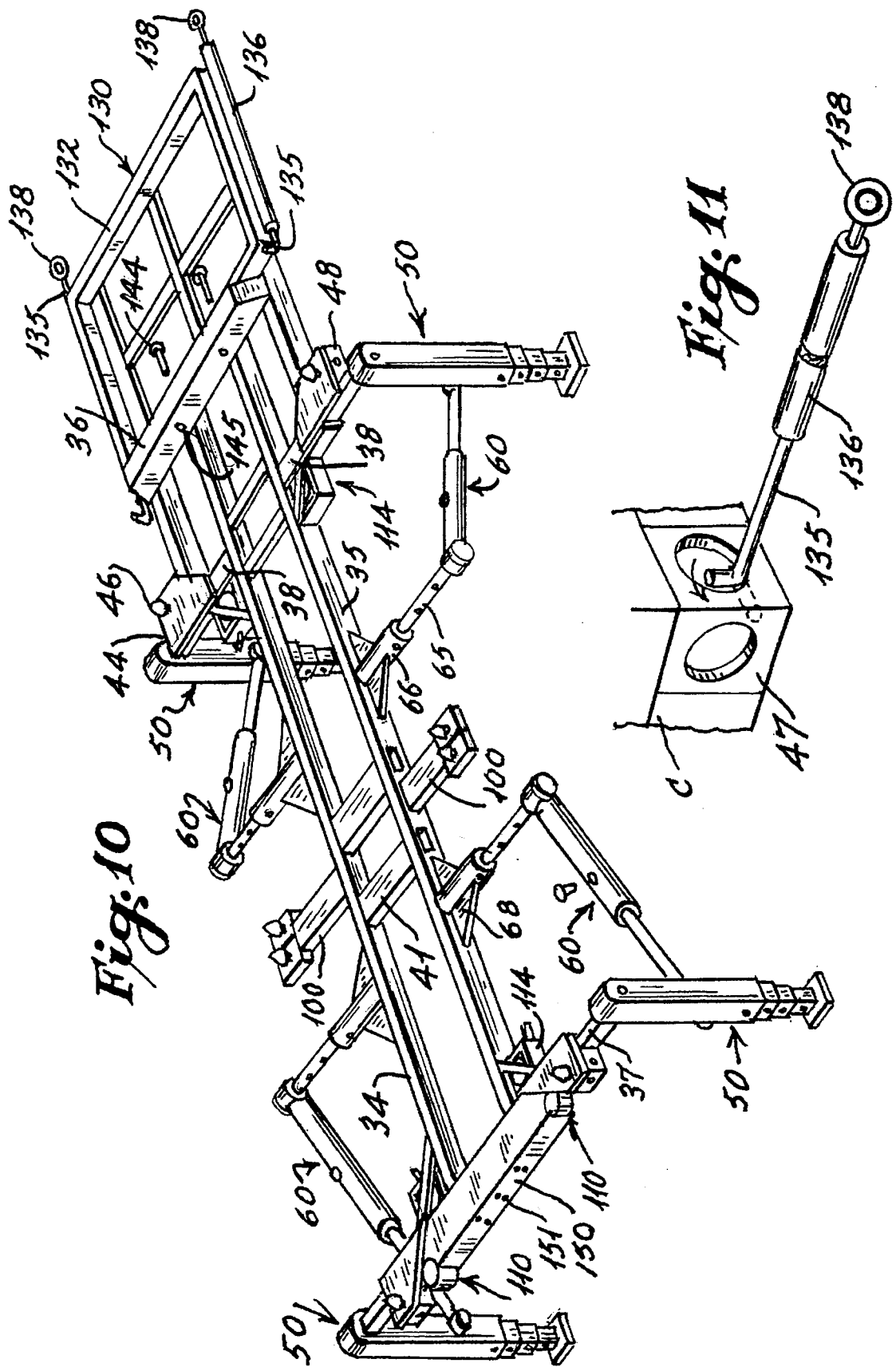

CARGO CONTAINER HANDLING SYSTEM

CROSS REFERENCE TO RELATED APPLICATIONS

This appliation is a continuation in part of applicant's prior U.S. application, Ser. No. 08/144,036, filed Nov. 1, 1993 now U.S. Pat. No. 5,147,540.

BACKGROUND OF THE INVENTION

1. Field of the Invention

This invention is generally directed to systems for transporting, supporting and storing cargo containers of the type utilized in local and long distance shipping and warehousing of bulk goods or freight and more particularly to such a system which incorporates support frames which are interlockable with the shipping containers and which serve to support the shipping containers when unloaded from a transporting vehicle such as a flat bed truck, trailer, water vessel or railway car. In one embodiment of the present invention, the frames are designed to be self-elevating with respect to the transporting vehicle so that the frames may be raised and lowered in order to permit a plurality of legs to be extended horizontally and then vertically to support the containers above the bed of the transporting vehicle. After elevation, the vehicles may be simply driven from under the frames and containers. Thus, the containers are loaded or unloaded without elevating equipment such as hoists, cranes or forklifts.

In the preferred embodiments, the frames are interlocked with alignment cradles which are mounted to the transport vehicles. The cradles may include guidance elements which cooperate with lift assemblies which elevate the cradles, support frames and shipping containers relative to the transporting vehicle. In another embodiment, auxiliary raks are selectively mounted to the ends of the support frames.

2. History of the Related Art

Due to the high costs associated with shipping goods both locally and long distance, and due to the need to standardize the manner in which freight is warehoused and shipped, many goods are transported in large shipping containers. The shipping containers are conventionally loaded and unloaded from transport vehicles by the use of forklifts or cranes. Unfortunately, such systems require that equipment be available at each point at which a container is to be loaded or unloaded from a transport vehicle. This limits the available points of delivery or pickup for goods being shipped or requires that the transporting vehicle be retained in an area where goods are to be loaded or unloaded for often lengthy periods of time. By way of example, if a shipping container is to be loaded with household goods for an individual moving from one area to another, it is conventionally necessary for a truck having a trailer to remain at the point of loading until the shipping container is loaded. During this period of time, the motor vehicle and trailer are not being used for their primary purpose of hauling freight from one location to another, thus increasing the cost of shipping.

To overcome the deficiencies with respect to such conventional shipping techniques, shipping systems have been developed which allow shipping containers to be unloaded from a transport vehicle at a point of delivery or at a point of loading until the container is ready for further shipment. In U.S. Pat. No. 3,817,413, a load-carrying body for a vehicle is disclosed which includes a container which is supported by a frame including longitudinal rails mounted to the vehicle. The container is rollable with respect to the vehicle frame and includes vertically positionable legs which support the container when it is rolled from the frame. Unfortunately, this type of transport system uses specialized containers and requires that the containers be exactly aligned with the vehicle both vertically and horizontally during loading and unloading which, in a practical sense, would rarely be possible.

Another example of a detachable truck bed or body is disclosed in U.S. Pat. No 4,076,299 to Dalton. This patent discloses a truck bed which is elevated from the frame of a truck by the use of hydraulic cylinders. After the bed has been raised a plurality of legs are lowered into engagement with the ground thereby supporting the bed above the truck frame. The truck is thereafter driven from under the truck bed. Unfortunately, with this type of system, the hydraulic cylinders are only provided on the truck frame and thus the support frame cannot be self-loading or unloading on conventional shipping vehicles including railway flat cars or conventional flat bed trucks. In addition, the patent does not provide for a precise alignment between the removable truck bed and the truck frame.

Another type of container transport system is disclosed in U.S. Pat. No. 4,053,073 to Franchin. In this system, the containers which are to be transported by a vehicle include hydraulic cylinder lifts at each corner. In this manner, when it is desired to elevate the container from the vehicle, the cylinders are activated and the container is raised. Unfortunately, with this type of system, the cylinders also function as the support legs for the container. Therefore, extremely large hydraulic cylinders must be provided so as to enable the containers to be lifted to a height of approximately 51" or more. Thereafter, the fluid cylinders must support the weight of the cargo container for extended periods of time. Such a system is highly impractical and expensive.

In U.S. Pat. No. 3,995,760 to Burgdorf et al., a motor vehicle container transport and support system is disclosed wherein containers are supported on frames which are detachably mounted to a cradle mounted to a vehicle bed such as the bed of a tractor trailer. This patent discloses that the cradle provides a means for aligning the support frame with respect to the vehicle during loading and unloading. The patent further discloses the use of an interlock system for securing the containers to the frame. When it is desired to release the frame from a motor vehicle, the legs of the frame are first extended outwardly with respect to the frame and the legs lowered vertically. Once the legs are in contact with the ground the vehicle may be moved with a sliding motion being established between the frame and the cradle. Unfortunately, this type of sliding between the frame and the cradle is not practical and a great deal of stress is imparted to the support legs during loading and unloading. With this system, the frame for supporting the shipping container is locked to the cradle by locking mechanisms similar to that provided for locking a container to the frame. This requires separate activation of a plurality of locking mechanisms to secure the frame to the cradle.

Some additional examples of prior art systems are disclosed in U.S. Pat. Nos. 2,478,578 to Gottshall, 3,119,503 to Herpich et al., 3,152,709 to Fowler, 3,722,948 to Walsh et al., 3,724,697 to Arvidsson, 4,000,924 to Blasingame, 4,089,539 to Berger, and 4,339,148 to Smith et al.

SUMMARY OF THE INVENTION

An apparatus for transporting and supporting cargo containers utilized to ship various goods and freight wherein the containers are hauled on various transport vehicles including tractor trailers. The system includes an elevatable frame having an upper surface on which at least one cargo container may be supported and support surface which includes a pair of spaced elongated rails. The frame includes opposite end portions and a central portion. The front portion is reinforced by a transverse beam mounted above the rails so that the space between the rails is open at the front of the frame. A pair of legs are pivotably mounted in outrigger fashion to opposite sides, and adjacent the end portions, of the frame and are reinforced by struts which are also telescopically mounted relative to the frame. In one embodiment, lift members are mounted on the frame for engaging the bed of the transport vehicle so as to selectively elevate the frame with respect to the bed. Locking members are provided extending from the upper surface of the frame which are engagable with cooperating locking members mounted on the containers so that, when the containers are mounted on the frames, they are positively secured thereto.

In the preferred embodiment, an alignment cradle is mounted below the frame and includes a pair of elongated tapered centering rails which are cooperatively received between elongated rails of the frame. The centering rails on both the cradle and the frame and the open ends on the frame ensure alignment of the frame relative to a vehicle to which the cradle is mounted.

In the preferred embodiments of the present invention, the frame is automatically interlocked with the alignment cradle by way of locking pins which are connected to the struts which are mounted to the legs associated with the frame. When the legs and struts are retracted into a transport position, the locking pins connected thereto will pass through openings in the alignment cradle thereby locking the alignment cradle to the main frame.

In one embodiment, lifting cylinders are mounted to the transport vehicle and are used to raise and lower the cradle. Guide members are mounted to the cradle and are received within sleeves mounted to the vehicle. The guide members stabilize the cradle as it is raised and lowered and relieve stress on the lifting cylinders.

In another embodiment of the present invention, auxiliary support racks are releasably engageable at both end portions of the frame. Each auxiliary rack includes locking pins for engaging within the locking members mounted to the frame or a container mounted to the frame and chains for engaging conventional locking receivers or castings included on most long distance shipping containers.

It is the primary object of the present invention to provide a system for transporting, storing, and supporting cargo containers which allows the containers to be removed from conventional transport vehicles without the aid of separate hoist or elevating equipment, such as forklifts, so that the containers may be loaded and unloaded with respect to a transport vehicle at substantially any location leaving the vehicle free for use while the container is loaded, emptied, or otherwise left for storage purposes.

It is yet a further object of the present invention to provide a system for transporting and supporting conventional cargo containers wherein the containers are securely locked to support frames which frames themselves are automatically locked to a transport vehicle when the legs of the frames are retracted to a travel position.

It is also an object of the present invention to provide a system for supporting cargo containers which enables the containers to be loaded and unloaded with respect to transport vehicles even in very narrow spaces whereby the containers may actually be stored in substantially side-by-side relationship and yet still be accessible for easy loading on a transport vehicle without the aid of hoist or lift equipment.

It is yet another object with the present invention to provide additional hauling capacity for transport vehicles by providing auxiliary container support racks which may be releasably attached to cargo container support frames mounted to the transport vehicles.

It is also an object of the present invention to provide a system for shipping and storing cargo containers wherein the containers are mounted to support frames which include lift assemblies and wherein the frames are accurately aligned with ground transport vehicles using elevating alignment cradles to which frames are positively locked whenever the frames are collapsed into a transport configuration.

BRIEF DESCRIPTION OF THE DRAWINGS

FIG. 1 is a side illustrational view showing a frame of the present invention carried on the bed of a tractor trailer and on which two cargo containers are supported.

FIG. 6 is a hydraulic circuit for controlling the lift cylinders shown in FIGS. 4 and 5.

FIG. 7 is a pneumatic circuit for controlling pneumatic lift devices mounted to a frame of the present invention.

FIG. 8 is a side illustrational view of another embodiment showing auxiliary support racks mounted forward and rearwardly of the frame of the present invention.

FIG. 9 is a top plan view of the frame and auxiliary support racks shown in FIG. 8.

FIG. 10 is a perspective view of another embodiment of the present invention.

FIG. 11 is an enlarged illustrational view of a locking mechanism utilized to secure the auxiliary racks of FIGS. 8 through 10 to a locking caster of a cargo container.

DESCRIPTION OF THE PREFERRED EMBODIMENTS

Figure 2:
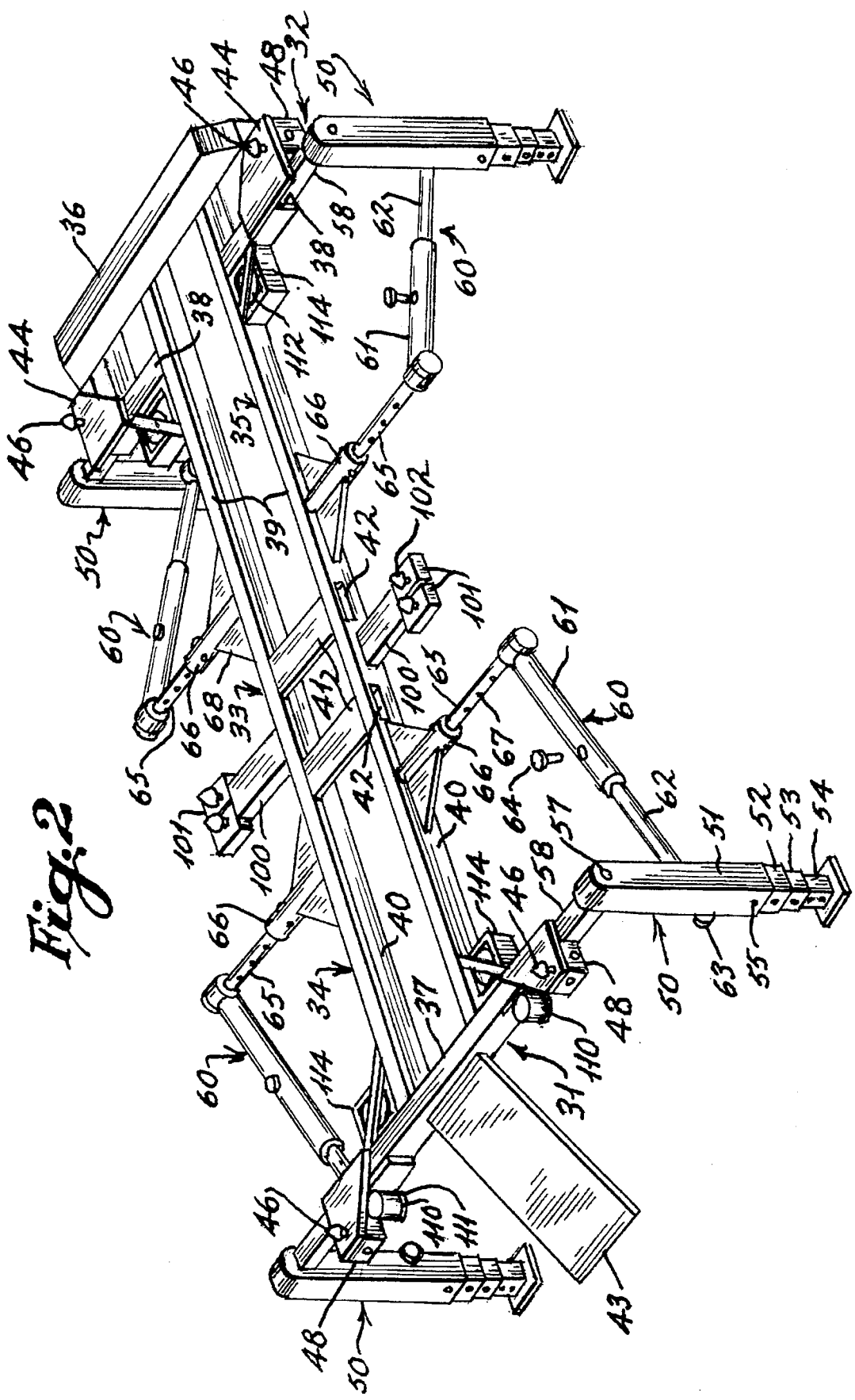
FIG. 2 is a perspective view of the frame of FIG. 1 with the frame being shown with leg assemblies extended for supporting the frame from the ground.

With continued reference to the drawing figures, the transporting and support system of the present invention is designed for use with heavy duty cargo containers of the type which are utilized for short and long distance hauling, shipping and/or storage. In the drawing figures, the cargo containers "C" are shown as being transported on conventional low bed trailers "T" pulled by a conventional truck tractor. It should be noted that other types of motor vehicles may be utilized with the system of the present invention including other types of trucks, railway vehicles, and ships. One or more cargo containers may be loaded on given transport vehicle. In FIG. 1, two such containers are mounted to the bed "B" of the trailer "T".

The support assemblies of the present invention include a primary support frame 30 having front and rear end portions 31 and 32 and an intermediate portion 33. The frame 30 includes a pair of longitudinally extending rails or beams 34 and 35 which are welded or otherwised secured at their ends to hollow transverse beams 36 and 37. A pair of secondary transverse hollow beams 38 are welded to the rails and extend perpendicularly outwardly therefrom adjacent the forward end portion 31 of the frame and spaced rearwardly of beam 36. The rails are of an inverted L-shaped configuration having an upper horizontal lip or ledge 39 and downwardly and outwardly sloping sides 40. The center portion 33 of the main frame is reinforced by providing upper plates 41 which are welded or otherwise secured to the rails 34 and 35.

It should be noted that the transverse beam 36 is welded to the upper portion of the rails, thus leaving the front portion of the frame between the rail open for purposes which will be discussed in greater detail hereinafter.

A pair of openings 42 are provided in the side rails 34 and 35 below the plates 41 so as to accept the forks of a lift mechanism such as a forklift. The outer portions of the frame may be reinforced by cross bracing, not shown.

As more particularly shown in FIG. 2, the transverse beam 37 includes an opening allowing the selective placement of a slidable ramp 43. Although, only one ramp is shown in FIG. 2, a ramp may be provided within both end portions 31 and 32.

In order to secure the support frames to a container "C", plates 44 are welded or otherwise secured at each of the corners defined by the ends of the beams 37 and 38. Mounted to each plate 44 is an upwardly extending locking pin 46. The pin elements 46 are engagable within receivers or locking castings 47 provided at each corner of the cargo container "C". The pins 46 have non symmetrical heads and are rotatably by a suitable handle (not shown) attached thereto. When the handle is pivoted horizontally, the head of the pin 46 is rotated so as to lock within the opening in the locking casting 47. One suitable type of locking mechanism is a SCHULZ® TWISTLOCK TYPE F26NS.

The locking pin assemblies further include, below each plate 44, receivers or locking castings 48 which are similar to the receivers on the containers. These are provided for purposes of allowing a vertical stacking and interlocking of a plurality of frames for transport by a common carrier and for securing supplemental container support racks on the ends of the frame as will be discussed hereinafter.

Figure 3:
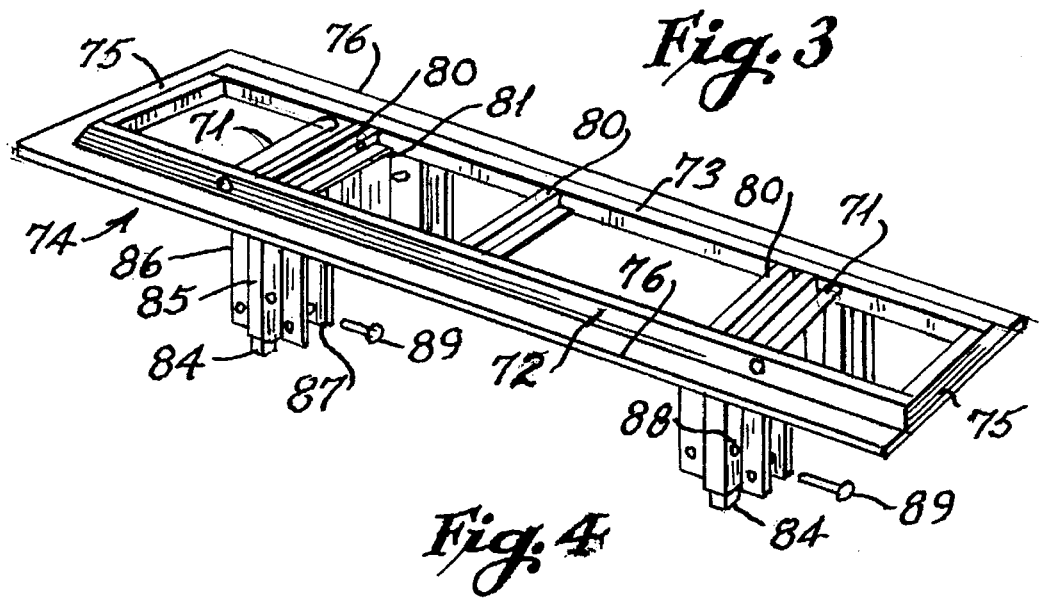
FIG. 3 is a perspective view of an alignment cradle for use in aligning a frame, such as shown in FIG. 2, with respect to the bed or undercarriage of a transport vehicle and further showing mounting brackets by way of which the alignment cradle may be secured to the undercarriage of a transport vehicle.
Figure 4:
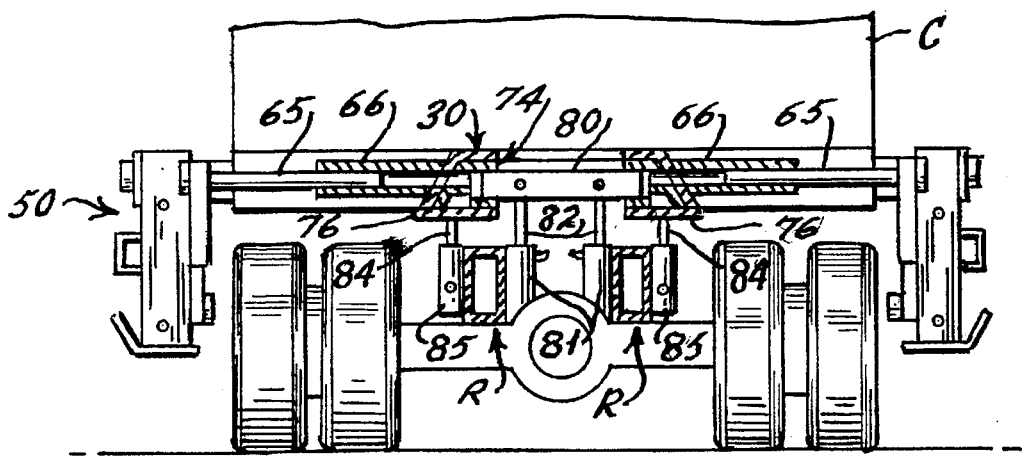
FIG. 4 is a cross-sectional illustrational view showing the cradle of FIG. 3 being elevated by lift cylinders secured to the undercarriage of a transport vehicle wherein the frame is raised to allow leg assemblies to be extended, as shown in FIG. 5.

To support the frame 30 from the ground, a leg assembly 50 is provided at each corner of the frame. The leg assemblies include an outer housing 51 and telescoping inner extensions 52, 53 and 54. An enlarged support pad is mounted at the base of the telescoping portion 54. Handles, such as showin in FIG. 4, may be provided to help manipulate the leg extensions. A plurality of selectively aligned openings 55 are provided through each of the leg assembly sections and a locking pin is provided for locking the components when a selective set of openings are aligned. Each leg assembly is mounted on a pivot 57 secured to a moveable outrigger beam 58 which is slidably received within one of the end portions of beams 37 and 38. In this respect, each leg assembly 50 is designed to be positioned generally horizontally and in a retracted position beneath the cargo container during shipment as shown in FIG. 1. However, when the leg assemblies are extended outwardly of the frame and pivoted vertically, as shown in FIGS. 2–4, the leg assemblies are extended to support the frame 30 thereby allowing the frame and container to be raised and removed from the bed "B" of the trailer "T". Further, it is necessary to extend the legs outwardly relative to the frames so as to provide clearance to maneuver the trailer beneath the frame without accidentally hitting the legs.

Each leg assembly 50 is stabilized by a reinforcing strut assembly 60 having an outer housing 61 and a telescoping arm 62 having its outer end pivotally secured at 63 to the leg assembly 50. The upper end of the strut is pivotably connected at 63 to a locking bar or pin 65 which is slidably carried in a support sleeve 66 which is secured to the side rails 34 and 35, such as by welding. The sleeves are reinforced by plates 68 which are welded thereto and which extend outwardly therefrom diagonally to the side rails 34 and 35. Each arm 62 may be resiliently urged outwardly of its housing 61, and, when the leg assemblies are in proper position, a retention pin 64 is provided to retain the arms in extended position. Also, a plurality of spaced openings 67 are provided in the locking bar or pin 65 which are alignable within an opening 69 in the sleeve 66. When the strut assembly has been pulled outwardly from the frame a selected distance, a retention pin is extended through the opening in the sleeve and in the aligned opening in the locking bar or pin to thereby retain the strut in extended position.

Figure 5:
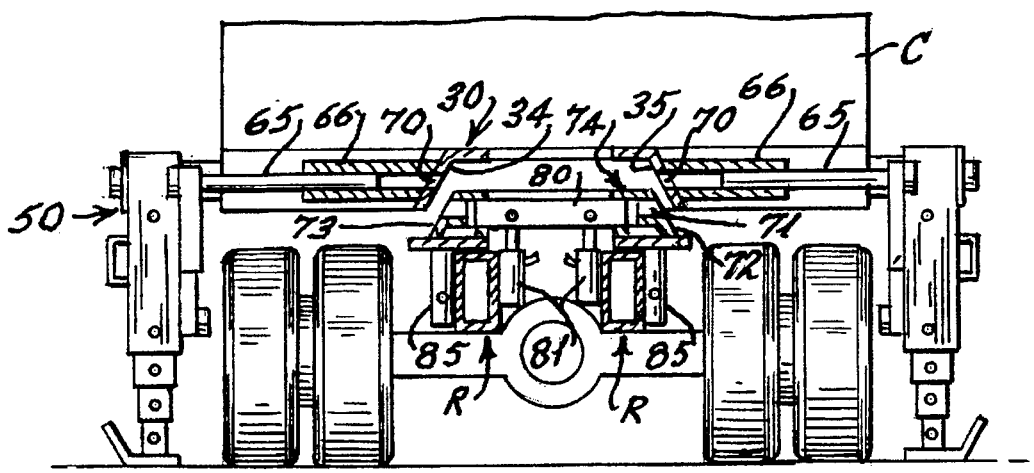
FIG. 5 is a cross-sectional illustrational view similar to FIG. 4 showing the leg assemblies lowered to support the frame above the vehicle undercarriage whereby the vehicle may be driven from beneath the frame and cargo container.

With reference to FIGS. 3–5, it should be noted that each locking pin 65 passes through an opening 70 in one of the rails 34 and 35 and will enter through openings into one of a pair of sleeves 71 mounted between a pair of centering rails 72 and 73 of an alignment cradle 74. The alignment cradle is generally formed of a steel frame which includes the elongated side rails 72 and 73 which are sloped outwardly so that a cross section taken through the alignment cradle is generally trapezoidal in configuration. In this manner, as the frame is raised or lowered, respectively, with respect to the alignment cradle, the sloped side rails 34 and 35 will cooperatively engage with the centering rails 72 and 73 of the alignment cradle thereby ensuring that the frame is properly positioned with respect to the alignment cradle. With the frame seated on the alignment cradle, the locking pins 65 will extend within the sleeves 71 of the alignment cradle thereby positively locking the main frame to the alignment cradle.

The ends of the alignment cradle further include sloped reinforcing walls 75. Mounting plates 76 extend beneath and from the rails 72 and 73 and are utilized to support the alignment cradle on the bed of the vehicle. In one embodiment, the alignment cradle will be secured to the trailer undercarriage.

The centering rails 72 and 73 of the alignment cradle 74 are reinforced by a plurality of spaced stabilizer brackets 80 which are welded or otherwise secured to the rails. In the embodiment shown in FIGS. 3–5, the alignment cradle is vertically raised and lowered with respect to the undercarriage of the vehicle by pairs of spaced hydraulic cylinders 81 which are securely attached in spaced relationship with respect to one another to reinforcing beams "R" of the vehicle undercarriage. Each cylinder 81 includes a piston rod 82 which is bolted or pinned to a reinforcing member 80. The cylinders 81 are activated by a hydraulic circuit as will be discussed in greater detail hereinafter.

With specific reference to FIG. 5, the cargo container "C" is shown as being mounted to the support frame 30 with the legs extended so that the frame 30 is in spaced vertical relationship to the alignment cradle 74. With the present invention, with the transverse beam 36 of the front end portion of the frame 30 being elevated above the side rails 34 and 35, there is no obstruction between the rails 34 and 35 to the alignment cradle 74 as the trailer is backed into underlying relationship with respect to the frame 30. This allows a minimum clearance to be maintained between the frame and the alignment cradle, thus allowing the overall frame height to be lower than existing transport frames. With the alignment cradle positioned beneath the frame 30, the pistons 81 are activated so as to raise the alignment cradle as is shown in FIG. 4. Once the alignment cradle engages the side rails 34 and 35 of the support frame, the leg assemblies may be lifted and thereafter retracted so that the locking pins 65 enter into the channels 71 of the alignment cradle, thereby securing the frame 30 to the cradle. The cylinders 81 are thereafter activated to retract the piston rods 82, lowering the alignment cradle and frame into a transport position as shown in FIG. 8 of the drawings.

In order to relieve stress on the piston rods 82 and to stabilize the load of the container with respect to the truck undercarriage, a plurality of sliding steel guide tubes 84 are welded and extend from and beneath the mounting plates 76 of the cradle. Each tube 84 is guided within a fixed sleeve 85 which is welded to one of a pair of space bracket plates 86 and 87 which are bolted or otherwise secured on opposite sides of each of the reinforcing beams "R" of the vehicle undercarriage. In this manner, the plates 86 and 87 and the guide sleeves are fixed to the undercarriage. The tubes 84 are slidable within the sleeves 85 so that the tubes 84 provide lateral support to reduce the stress to the piston rods 81 as they are raised and lowered with respect to the pistons 80. Aligned openings 88 are provided in each sleeve 85 and receive locking pins 89 which are inserted therethrough and through aligned openings provided in the tubes 84 when the tubes are in a lowered position, as in shown in FIGS. 3 and 5. It should be noted, that in some embodiments, the alignment cradle may be directly and nonadjustably secured to the bed of a transport vehicle. In these embodiments, the mounting plates can be bolted, welded or secured by other fasteners to a flatbed of a tractor trailer or other vehicle.

With specific reference to FIG. 6, a hydraulic control circuit for operating the elevation of the cradle utilizing the pistons 81 is disclosed. An up/down control switch 90 is connected to a source of power supply such as a 12 volt battery of a transport vehicle which is connected through a solenoid 91 to a pump motor 92 which controls the supply of a fluid from a reservoir 92'. The fluid supply is provided through line 93 to a manual flow control valve 94 which supplies fluid through a magnetic switch valve 95 connected to the source of electrical power 90 to a four-way flow divider 96. From the flow divider, hydraulic fluid is provided to each of the cylinders 81. A return line is established from the cylinders 81 through the magnetically activated flow restriction valve 95 and through a filter 97 and return line 98 to the reservoir.

With specific reference to FIG. 2, the present invention further includes means for allowing several containers to be mounted to a single frame. International shipping containers are generally utilized in fixed dimensions such as approximately 10, 20, 24 and 40 feet. Assuming the frame in FIG. 8 to be normally utilized for a 20 foot container, the frame may be adapted to allow two 10 foot containers to be carried at a given time. In this respect, extending from the center portion of each of the rails 34 and 35 are outrigger support arms 100. Each support arm is welded to a respective rail and may be reinforced by appropriate members, not shown. Each outrigger member includes an outer pair of plates 101 which are generally horizontally aligned with the plates 44 at the corners of the frame 30. Extending upwardly from each plate 101 is a locking pin element 102 which is operable in the same manner as elements 46. The locking elements 102 are spaced at a fixed distance from locking elements 46 which is an industry set distance. In this manner, two containers may be mounted to a single frame 30 as shown in FIG. 1 or a single larger container may be mounted directly to the locking elements 46 at the corners of the frame 30.

In instances where the alignment cradle is not elevated by pistons 81 connected to a vehicle undercarriage, the support frame 30 includes a first set of compact hydraulic cylinders 110 having short thrust extendable pistons 111 to raise the frame and container from the cradle and the bed of the vehicle. The pistons 111 need only be several inches in length as it is only necessary for a limited clearance to be provided between the frame and cradle to allow the legs 50 to be cantilevered from the beams 37 and 38 and thereafter rotated into a vertical position, as shown in FIG. 2. The legs are extended outwardly a sufficient distance to allow clearance for maneuvering the vehicle beneath the frame. With the locking pins 56 removed from the leg assemblies, the telescoping sections are allowed to descend until the pads engage the ground. Thereafter, the pins are reinserted through aligned openings 55 in the legs. During the movement of each leg assembly, the strut 60 is also pulled from the support frame disengaging the locking pins 65 from the alignment cradle while simultaneously allowing the telescoping arm 62 of each strut assembly 60 to be extended. Once the legs are properly vertically aligned, the retention pins are inserted to retain the strut assembly in its extended position thereby reinforcing and bracing each leg assembly at the corners of the frame. In some instances the strut assemblies may be extended independently of the legs with appropriate attachment means being provided to connect the struts to the legs.

Once each leg and strut assembly has been properly locked into place, the hydraulic cylinders 110 are reactivated withdrawing the pistons 111 thereby allowing the container "C" to be supported only by the frame 30. As the frame remains elevated several inches (2 to 5, generally) above the cradle and truck bed "B" it is only necessary for the operator to drive the trailer from under the frame so that the vehicle may be put to further use while the container is being loaded, unloaded or temporarily stored.

In order that the support frame of the present transport system may be utilized with substantially any type of transport vehicle, in the preferred embodiments, a separate independent set of lift members are mounted in spaced relationship at the four corners of the frame 30. These lift members are in the form of inflatable air bags or bladders 112 which are mounted within housings 114 which are welded or otherwise secured both to the longitudinal rails 34 and 35 of the frame as well as the cross beams 37 and 38. As with the hydraulic cylinders, when the air bladders are inflated, they will extend below the frame engaging the bed of the transport vehicle and thereby providing lift to raise the frame and any cargo container thereon relative to the bed. After the leg assemblies 50 have been placed into proper support position, the bladders are deflated and the transport vehicle driven from beneath the frame 30 as has been previously discussed with respect to the hydraulic lifts.

In view of the foregoing, the frame 30 of the present invention may be elevated either by the cradle 74, the hydraulic cylinders 110 or the air bladders 112. The hydraulic cylinders 110 are connected to a hydraulic control valve system, as depicted in FIG. 6. The air bags are connected, when necessary, by way of air lines which extend to a control circuit which is connected to a source of air pressure associated with the transport vehicle.

FIG. 7 discloses the control circuit for use with the air bladders 112. Each of the air bladders is connected through air lines 115 to a distribution valve 116 which ensures equalization of pressure in each of the lines 115. The distribution valve 116 is connected by a supply line 117 to a control valve assembly 118. The control valve assembly 118 is connected by a quick disconnect coupling 119 to the air brake system of the transport vehicle. The control valve 118 includes an inlet control button 120 and an exhaust control button 121. Although not shown in the drawing figures, the control valve 118 is adjustable to allow a regulation of input and exhaust air to thereby control the rate at which the bladders 112 are expanded and contracted. As with the hydraulic cylinders, it is generally necessary that the air bladders only inflate to a maximum of 2"–5" in order to allow sufficient clearance of the frames relative to the bed of the transport vehicle. In some instances, the air bladders may be utilized when the frame is mounted to the transport vehicle to act as a shock absorbing system, especially if fragile loads are being transported in the cargo containers. When being used as shock absorbers, the bladders need only be partially inflated.

With particular reference to FIGS. 8 and 9, another embodiment of the present invention is disclosed in greater detail. In this embodiment, the frame 30 is used in conjunction with forward and rear auxiliary support racks 130 and 131. Each of the racks 130 and 131 is utilized to support plywood shipping containers C2 of a type conventionally utilized in the shipping and hauling industry. Conventially, such containers are 4'×8'×8' or smaller. Each rack includes an outer peripheral frame 132 and 133, respectively, formed of an L-shaped channel iron or steel which is reinforced by cross-bracing 134. Each rack is mounted either to the corner locking casters 48 of the frame 30 or the corner locking casters 47 of the cargo container utilizing elongated locking rods 135. As shown in FIG. 11, each locking rod 135 is slidably disposed within a guide sleeve 136 which is welded or otherwise secured to the bottom and sides of each of the racks 130 and 131. In FIG. 8, the racks 130 and 131 are shown as being mounted with the locking rods 135 extending into the corner locking casters 47 of the cargo container "C". The rods are slidably extended through an opening in each corner caster and thereafter rotated 90 degrees so that the bent end portion of the rod engages and locks within the corner caster. The forward end 138 of each locking rod 135 is formed with a closed ring to which one end of a bracing chain 140 is secured. A 'J'-hook 142 is secured to the opposite end of the chain 140 and is securable within each of the upper corner locking casters 47 of the cargo container "C". If further support is necessary, locking pins may be extended through the frame components 132 and 133 and into the box beams 36 and 37 at the forward and rear portion of the frame 30.

As opposed to locking the front and rear auxiliary racks 130 and 131 within the corner casters 47 of the cargo container C, and as shown in FIG. 9, the locking rods may be inserted into the corner locking casters 48 of the frame 30 and thereafter locked into position by rotation of the rods relative to the corner casters. Again, locking pins 144 may be utilized to connect the frame components 132 and 133 to the front and rear hollow beams 36 and 37, as is illustrated in FIG. 9.

From the foregoing, the shipping capacity of each frame may be easily increased for smaller containers by attaching the supplemental racks 130 and 131 forwardly and rearwardly of the frame.

With specific reference to FIG. 10, a further embodiment of the present invention is shown in greater detail. In this embodiment, the forward portion of the frame 30 has been extended an additional two feet to allow for the transport of enlarged containers such as 24' containers utilizing a 20' frame. Under such circumstances, two feet of the enlarged container extend beyond the forward locking elements 46 and rearwardly of the rear locking elements 46. As shown in the figure, the transverse hollow reinforcing beam 36 is mounted to the ends of the elongated side rails 34 and 35 and has secured thereto a forward auxiliary rack 130 which is mounted by pins 144 which extend through aligned openings in the frame 132 of the rack 130 and aligned openings 145 through the beam. As with the embodiment disclosed in FIGS. 8 and 9, once an enlarged container is placed on the frame 130, the locking rods 135 may be inserted directly into the corner casters of the enlarged container or, the elongated locking rods may be made a sufficient length to extend an additional two feet into the corner caster 38 associated with the corner of the frame 30.

Although a rear supplemental rack 131 may also be utilized with the embodiment of FIG. 10, in some instances, super-sized containers must be transported. These large containers may extend 40 feet in length and thus require that two frames 30 be pinned together and aligned in relationship to one another. In order to accomplish this, the rear end transverse beam 37 has been modified as shown at 150 to present an outer planar surface having a plurality of openings 151 therein through which locking pins may be extended when two frames are aligned with the rear transverse beams in abutting relationship with respect to one another. In the embodiments where two frames are connected with one another, a common diverter valve must be utilized with both the hydraulic and pneumatic lift systems to ensure that each of the lift components of each frame operate in unison when activated.

In view of the foregoing, the present invention provides increased utility over prior article transport and storage systems. With the present invention, substantially any conventional size of cargo container or local shipping container may be supported by the frames 30 so that such containers may be easily and effectively loaded onto transport vehicles, conveyed to a destination, and offloaded leaving the vehicle free for further use while the cargo containers remain supported on the frames.

I claim:

1. A system for transporting and supporting cargo containers whereby the containers are hauled on a transport vehicle, the system comprising:

a frame having a front portion and a rear portion and a pair of spaced rails extending from said front to said rear portion, each of said rails having an outwardly inclined lower surface, a first transverse beam mounted adjacent said front portion of said frame and above said rails and a second transverse beam mounted to said rear portion of said frame, a pair of third beams extending perpendicularly outwardly on opposite sides of said rails adjacent to said front portion of said frame, a first pair of spaced leg assemblies pivotally mounted with respect to outer end portions of said third beams and a second pair of spaced legs pivotally mounted relative to opposite end portions of said second beam, each of said leg assemblies being vertically extensible, an alignment cradle means mounted to said transport vehicle and including a pair of spaced centering rails having inclined upper surfaces of a configuration to cooperatively engage the inclined lower surfaces of said rails of said frame, locking pin means extendable through said rails of said frame and into engagement with said cradle means for locking said frame to said cradle means, a plurality of lift means for elevating said frame with respect to said transport vehicle, and means for controlling said plurality of lift means to raise and lower said frame relative to said transport vehicle.

2. The system of claim 1 in which said plurality of lift means are mounted to said frame.

3. The system of claim 1 including pairs of reinforcing strut means mounted in spaced relationship on opposite sides of said frame, said strut means having a first end pivotally secured to an adjacent one of said leg assemblies and a second end connected to one of said locking pin means.

4. The system of claim 3 in which each of said strut means includes at least first and second strut members which are telescopically moveable relative to one another, and means for securing said telescoping strut members relative to one another.

5. The system of claim 4 including a pair of openings in said rails of said frame, sleeve means mounted to each of said rails and extending outwardly in alignment with said openings therein, said locking pin means being slidably received within said sleeve means, a plurality of openings in each of said centering rails of said alignment cradle means, and said locking pin means being receivable within said openings in said centering rails of said alignment cradle means when said frame is seated on said alignment cradle means.

6. The system of claim 5 including means for reinforcing each of said sleeve means extending outwardly from said frame.

7. The system of claim 5 including locking elements extending upwardly from said frame adjacent each of said outer end portions of said second and third beams for selectively engaging locking casters of the container.

8. The system of claim 7 further including an outrigger support arm extending outwardly on either side of said frame and intermediate said second and third beams, and a pair of spaced locking elements mounted to each of said outrigger support arms.

9. The system of claim 7 including a plate element mounted at each of said outer end portions of said second and third beams, said locking elements extending upwardly from said plate element, and a locking caster element mounted at each of said outer end portions of said second and third beams and beneath said plate element.

10. The system of claim 9 including at least one auxiliary support rack means, said auxiliary support racks means including a frame having opposite side portions, locking means mounted adjacent each of said opposite side portions of said at least one auxiliary rack means, and means for securing said locking means to one of said front or rear portions of said frame.

11. The system of claim 10 in which said locking means includes an elongated rod having an outer end portion, said outer end portion being selectively receivable within a locking caster element mounted adjacent one of said front or rear portions of said frame.

12. The system of claim 11 including a pair of auxiliary rack means, a first auxiliary rack means being mounted to locking caster elements adjacent said front portion of said frame and a second of said auxiliary rack means being mounted to said corner locking caster elements adjacent said rear portion of said frame.

13. The system of claim 1 in which said first lift means includes a first plurality of fluid expansible means mounted to said frame and a first fluid circuit for connecting said first fluid expansible means to said means for controlling said lift means and a second plurality of fluid expansible means mounted to said frame, and a second fluid circuit for connecting said second fluid expansible means to a second means for controlling said second plurality of fluid expansible means.

14. The system of claim 1 in which said plurality of lift means includes a plurality of lift cylinders mounted to said transport vehicle and having piston rods connected to said alignment cradle means, a plurality of guide members secured to said alignment cradle means and extending downward therefrom, and sleeve means mounted to said transport vehicle in which said guide means are slidably received.

15. A system for transporting and supporting cargo containers system comprising:

a. a transport vehicle having an undercarriage including beam elements;

b. a frame having a front portion and a rear portion and a pair of spaced rails extending from said front to said rear portion, each of said rails having an outwardly inclined lower surface, a first transverse beam mounted adjacent said front portion of said frame and above said rails and a second transverse beam mounted to said rear portion of said frame, a pair of third beams extending perpendicularly outwardly on opposite sides of said rails adjacent to said front portion of said frame, a first pair of spaced leg assemblies pivotally mounted with respect to outer end portions of said third beams and a second pair of spaced legs pivotally mounted relative to opposite end portions of said second beam, each of said leg assemblies being vertically extensible, an alignment cradle means including a pair of spaced centering rails having inclined upper surfaces of a configuration to cooperatively engage the inclined lower surfaces of said rails of said frame, locking pin means extendable through said rails of said frame and into engagement with said cradle means for locking said frame to said cradle means, a plurality of lift means mounted to said beam elements and connected to said cradle means for elevating said cradle means and said frame with respect to said transport vehicle, and means for controlling said plurality of lift means to raise and lower said frame relative to said transport vehicle.

16. The system of claim 15 including a pair of openings in said rails of said frame, sleeve means mounted to each of said rails and extending outwardly in alignment with said openings therein, said locking pin means being slidably received within said sleeve means, a plurality of openings in each of said centering rails of said alignment cradle means, and said locking pin means being receivable within said openings in said centering rails of said alignment cradle means when said frame is seated on said cradle alignment.

17. The system of claim 15 including a plate element mounted at each of said outer end portions of said second and third beams, said locking elements extending upwardly from said plate element, and a locking caster element mounted at each of said outer end portions of said second and third beams and beneath said plate element.

18. The system of claim 15 including at least one auxiliary support rack means, said auxiliary support racks means including a frame having opposite side portions, locking means mounted adjacent each of said opposite side portions of said at least one auxiliary rack means, and means for securing said locking means to one of said front or rear portions of said frame.

19. The system of claim 18 in which said locking means includes an elongated rod having an outer end portion, said outer end portion being selectively receivable within a locking caster element mounted adjacent one of said front or rear portions of said frame.

20. The system of claim 18 including a pair of auxiliary rack means, a first auxiliary rack means being mounted to locking caster elements adjacent said front portion of said frame and a second of said auxiliary rack means being mounted to said corner locking caster elements adjacent said rear portion of said frame.

* * * * *